(12) United States Patent
Clemo et al.

(10) Patent No.: US 9,214,044 B2
(45) Date of Patent: Dec. 15, 2015

(54) APPARATUS AND METHOD FOR AUGMENTING A VIDEO IMAGE

(71) Applicant: Sony Computer Entertainment Europe Limited, London (GB)

(72) Inventors: Graham David Clemo, London (GB); Thomas Lucas-Woodley, London (GB); William Oliver Sykes, London (GB); Amir Reza Safari Azar Alamdari, London (GB)

(73) Assignee: Sony Computer Entertainment Europe Limited (GB)

( * ) Notice: Subject to any disclaimer, the term of this patent is extended or adjusted under 35 U.S.C. 154(b) by 274 days.

(21) Appl. No.: 13/891,384

(22) Filed: May 10, 2013

(65) Prior Publication Data
US 2013/0321463 A1    Dec. 5, 2013

(30) Foreign Application Priority Data

May 31, 2012  (GB) .................................. 1209723.4

(51) Int. Cl.
*G09G 5/00* (2006.01)
*G06T 19/00* (2011.01)

(52) U.S. Cl.
CPC .................................... *G06T 19/006* (2013.01)

(58) Field of Classification Search
None
See application file for complete search history.

(56) References Cited

U.S. PATENT DOCUMENTS

| | | | |
|---|---|---|---|
| 7,864,198 B2 * | 1/2011 | Moroto et al. ................ | 345/629 |
| 8,659,622 B2 * | 2/2014 | Dhawan ........................ | 345/626 |
| 2006/0044327 A1 | 3/2006 | Okuno et al. | |
| 2008/0118118 A1 * | 5/2008 | Berger .......................... | 382/128 |

FOREIGN PATENT DOCUMENTS

| | | |
|---|---|---|
| EP | 1887523 A2 | 2/2008 |
| EP | 2512141 A1 | 10/2012 |

OTHER PUBLICATIONS

Grasset R. et al: "The design of a mixed-reality book: Is it still a real book?", Mixed and Augmented Reality, 2008. ISMAR 2008, 7th IEEE/ACM International Symposium ON, IEEE, Piscataway, NJ, USA, Sep. 15, 2008, pp. 99-102, XP031343982.
Jean Arlat et al: "Collecting, Analyzing and Archiving Results from Fault Injection Experiments", Dependable Computing (LADC), 2011 5th Latin-American Symposium ON, IEEE, Apr. 25, 2011, pp. 100-105, XP031880575.
Robinson J A et al: "The LivePaper system: augmenting paper on an enhanced tabletop", Computers and Graphics, Elsevier, GB, vol. 25, No. 5, Oct. 1, 2001, pp. 731-743, XP004318019.
Extended European Search Report for Application No. EP13159984 dated Jun. 4, 2013.
Search Report dated Oct. 18, 2012 for Application No. GB1209723.4.

* cited by examiner

*Primary Examiner* — Ryan R Yang
(74) *Attorney, Agent, or Firm* — Lerner, David, Littenberg, Krumholz & Mentlik, LLP (57) ABSTRACT

A method of augmenting a video image comprises the steps of estimating the extent of an identified surface captured within the video image and identifying skin pixels within a test area corresponding to the estimated extent of the identified surface within the video image. The method also includes extrapolating positions for skin pixels within the video image that are outside the estimated extent of the identified surface based upon the identified skin pixels, generating a mask from a combination of identified skin pixels and extrapolated skin pixels, and setting an extent of a computer graphic to be superposed substantially on top of the identified surface within the video image. The extent is greater than the estimated extent of the identified surface. The method further includes superposing the graphical augmentation of the video image responsive to the generated mask.

15 Claims, 9 Drawing Sheets

APPARATUS AND METHOD FOR AUGMENTING A VIDEO IMAGE

CROSS REFERENCE TO RELATED APPLICATIONS

The present application claims the benefit of and priority to GB Application No. 1209723.4, filed May 31, 2012, the entire disclosure of which is incorporated by reference herein.

BACKGROUND OF THE INVENTION

1. Field of the invention

The present invention relates to an apparatus and method for augmenting a video image.

2. Description of the Prior Art

Typical augmented reality (or 'AR') applications or systems receive live or recorded video images of a real environment, and then augment these video images with computer graphics in such a way that the computer graphics appear to move or be positioned in a manner consistent with the movement or position of the real environment in the video images.

The effect is to insert the computer graphics (or 'virtual objects') into the real environment in a consistent and believable way. Preferably this is done in real time; that is to say, the generation and augmentation of the video is performed at normal video frame rates. A good example of this can be seen in the game 'Eye Pet'® for the Sony® PlayStation 3® or 'PS3'®.

Most AR applications or systems achieve this by making use of a real object in the environment whose appearance and dimensions are known, and then in advance encoding the appearance and dimensions of this object as a reference model in a computer. By comparing the scale and orientation of this object as found in the video images with the reference model, it is possible for the computer to calculate the corresponding scale and orientation that should be applied to virtual objects used to augment the image.

Figure 1:
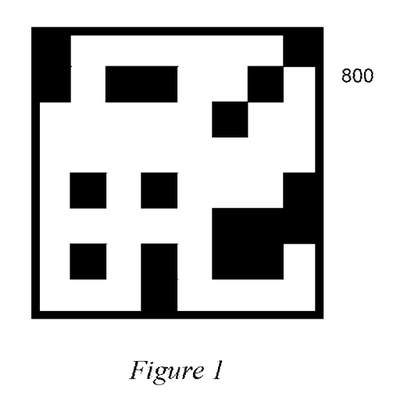
FIG. 1 is a schematic diagram of a fiduciary marker.

To improve the reliability of this process in adverse lighting conditions, or where the video camera in use has a low resolution, often the real object used is a so-called fiduciary marker 800, an example of which is shown in FIG. 1. Such markers typically have a high contrast border and patterning to improve robustness to lighting, and the pattern is typically asymmetric to help resolve the orientation of the marker.

Subsequently the augmentation of the video image by the AR application often positions computer graphics over the fiduciary marker so that a suspension of belief is achieved in the user; for example if the marker is placed on a flat surface, then the whole of the flat surface may be overlaid with a graphical effect (such as a racetrack, or a field or similar). In such cases, if the user wishes to interact with a real or virtual object on top of that flat surface, then the AR application may be able to identify the skin tone of the user and omit (or mask off) the overlaid computer graphics where it coincides with the user's skin in the video image, thereby making the user's skin (e.g. the user's hand) appear to be in front of the graphical layer.

However, often the accuracy of identification of the skin tone can be relatively poor, resulting in noisy or patchy masking of the user's hand over the computer graphics.

The present invention seeks to mitigate or alleviate the above problem.

SUMMARY OF THE INVENTION

In a first aspect, a method of augmenting a video image is provided in accordance with claim 1.

In another aspect, an entertainment device is provided in accordance with claim 9.

In another aspect, an augmented reality system is provided in accordance with claim 15.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

An apparatus and method for augmenting a video image are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

As noted above, the Sony® PS3® is a suitable apparatus or entertainment device for implementing augmented reality, typically when connected to a suitable video camera such as the EyeToy, and when operating under suitable software control (such as an AR application).

Figure 2:
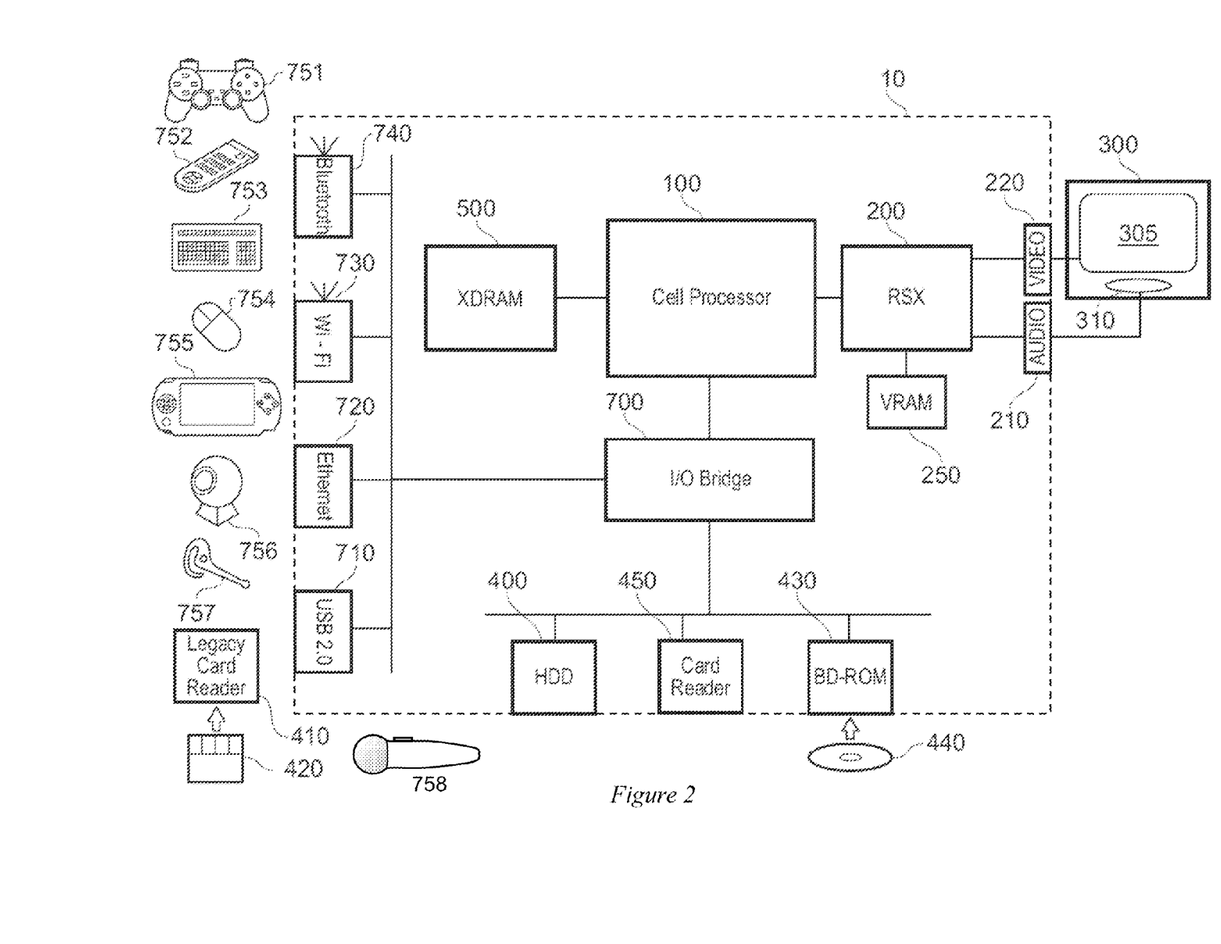
FIG. 2 is a schematic diagram of an entertainment device in accordance with an embodiment of the present invention.

FIG. 2 schematically illustrates the overall system architecture of a suitable entertainment device known as the Sony® Playstation 3® entertainment device or PS3®. The PS3 comprises a system unit 10, to which various peripheral devices are connectable including a video camera, as detailed below.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

In particular, these connections enable a video camera such as an EyeToy® video camera 756 (or a stereoscopic video camera, not shown) to be coupled to the PS3 in order to capture a video image (or stereoscopic video image pair) of the book.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the Playstation Move® 758 may be used as a controller. In the case of the portable entertainment device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In embodiments of the video camera, it is stereoscopic. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled person will be aware that a device driver or similar software interface may be required in the present embodiment described.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 3A:
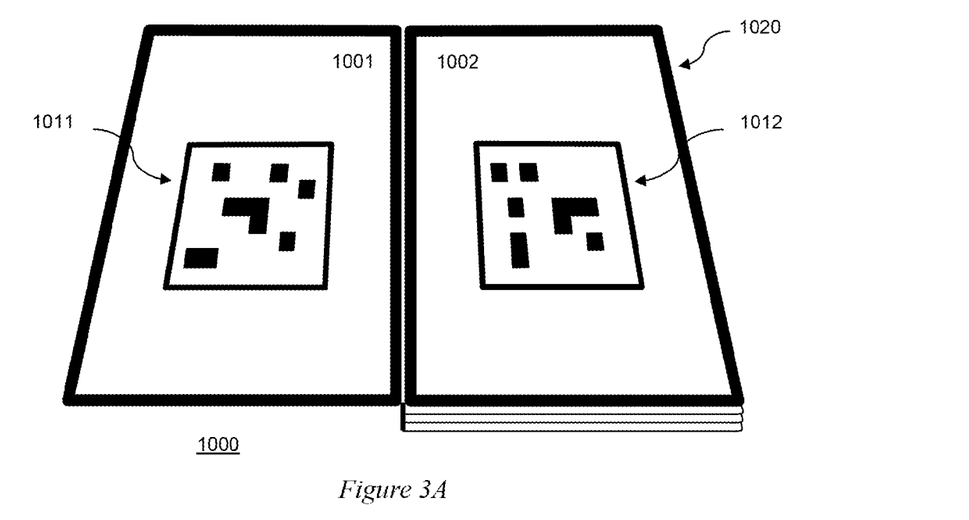
FIG. 3A is a schematic diagram of a book in accordance with an embodiment of the present invention.
Figure 3B:
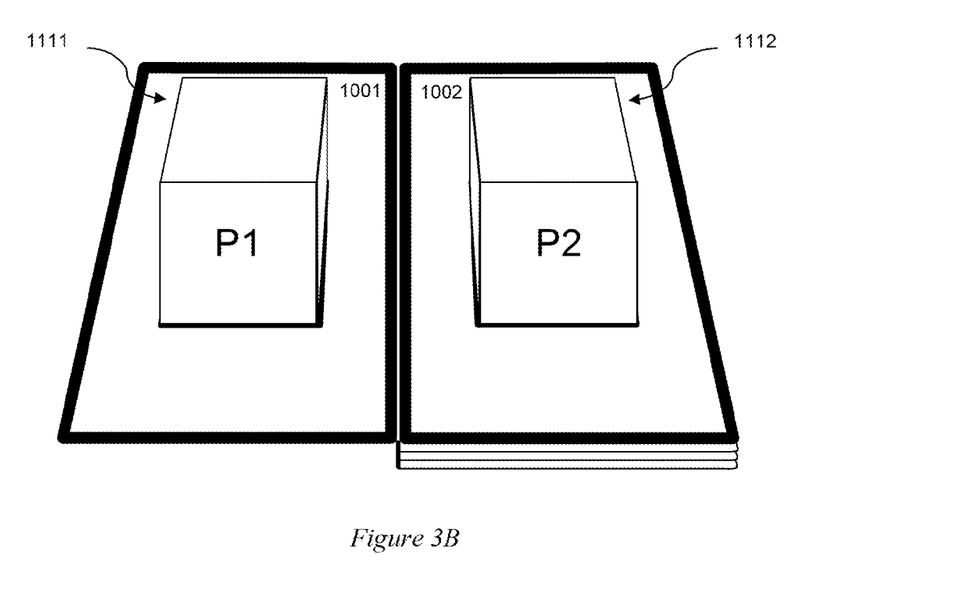
FIG. 3B is a schematic diagram of a captured video image of a book augmented in accordance with an embodiment of the present invention.

Referring now to FIGS. 3A and 3B, in an embodiment of the present invention a book 1000 has a plurality of rigid, turnable leaves (a so-called 'board book'), and comprises fiduciary markers 1011, 1012 on each page 1001, 1002, as shown in FIG. 3A. A leaf will be understood to be a single turnable sheet or panel of a book and typically comprises a page on each side. FIGS. 3A and 3B show, by way of example, pages 1 and 2 (respectively labelled 1001 and 1002). Optionally the inside front and/or back covers of the book may also act as pages and comprise fiduciary markings. Hence in this example, page 1 may in fact be the inside front cover. Similarly, optionally the outside front and/or back covers may comprise fiduciary markings. In addition, optionally each page is edged with a high contrast marking 1020 at the outside edges to facilitate detection of the extent of the page.

An entertainment device coupled to a video camera can capture an image of the book and use known techniques to detect the fiduciary markings on each visible page and hence locate those pages of the book. Given this information, then as illustrated in FIG. 2B an entertainment device can augment the captured video image of the book with pop-up virtual computer graphic elements 1111, 1112 corresponding to placement, scale and orientation of the fiduciary markings 1011, 1012 on the visible pages, and output the augmented video image for display. In this way the displayed version of the book becomes a 'magic' pop-up book in which the pages can come to life.

On many of these pages, it can be expected that graphical characters may act out a story, and require a user to interact with them. For example, in an interactive version of the well-known story of the three little pigs, a user may be asked on successive pages to gather straw, wood or bricks for the pig character on the respective page to use to build a house.

As such, in a typical usage the pages of the book can be treated as a series of surfaces for augmented reality play.

Hence in a typical usage scenario, the video image of the book presented on screen to the user is augmented by an overlay of computer graphics depicting a scene (such as a map showing the houses of the three little pigs) that completely covers the book.

Consequently if the user wishes to interact with this scene (for example to tap on house to start a corresponding part of the story) then they will move their hand over the book. Because their hand is also part of the original video image, it will also be covered by the overlaid computer graphics. This not only obscures the user's hand, making precise interaction (e.g. to point at the house) difficult, but it also spoils the illusion that the graphics are part of the book, because the user knows that their hand is above the book, but it is displayed as being underneath the computer graphics.

Therefore, as noted above, to address this an AR application can specifically modify the augmentation process by detecting skin pixels in the input video image, by any one of a number of known techniques, and applying a mask corresponding to those skin pixels so that the computer graphics are not superposed in the mask area corresponding to the skin pixels. As a result the user's hand, etc., then looks as though it is above the computer graphics that are overlying the book.

The identification of the skin pixels can be difficult in some situations due to shadows, different lighting colour temperatures, or low contrast between the user's skin and the background surface.

In an embodiment of the present invention, to improve the distinction between skin and the book, the pages of the book are a non-skin tone such as green or blue. Thus for example, the background of the book may be in a light blue colour, whilst the fiduciary markings (and any other markings) are printed in a dark blue. Alternatively a light and dark green colour scheme may be used.

Using such a colour scheme for the book, then within the region occupied by the book in the captured image it can be assumed that any pixels that fall within a wide range of skin tones must belong to the user, as all other pixels will be in the colour tones of the book.

It will be understood that the region occupied by the book in the video image is estimated by the AR application based upon the position, scale and orientation of the fiduciary marker or markers visible on the pages of the book, and their known physical relationship with the book (size, position etc.). Whilst for regions of the image where the book is visible in the video image, this can also be cross checked with the colour scheme of the book, in the area where the user's hand or arm crosses the edge of the book, then only the estimate is available.

Hence in an embodiment of the present invention, optionally the input video image is processed (for example by either the Cell processor 100 or by shaders in the Reality Synthesiser graphics unit 200 acting as an image processing means) to normalise the values of the red, green and blue ('RGB') colour channels of the captured image. That is to say, for a given pixel of the image, $S=R+G+B$, and the pixel's colour values are then updated to be $R/S$, $G/S$ and $B/S$.

This results in an image that preserves the R:G:B ratios of the original image whilst having a uniform brightness level, thereby removing the variations in the image that are due to highlight and shadow. One benefit of this is that any interaction errors due to a shadow from the user's hand falling on the book may therefore be mitigated by this step, although not necessarily completely eliminated.

Whether or not it is processed in this manner, the Cell processor 100 or Reality Synthesiser graphics unit 200 then tests each pixel in the estimated area of the book for whether it is a skin tone, based upon a first threshold ratio of red to blue values and/or a second, possibly different, threshold ratio of red to green values in the colour channels of the pixel under test. In other words, a pixel is classified as either a skin or non-skin pixel in response to whether the colour balance of the pixel exceeds a predetermined threshold purity of red, in dependence upon the R:B and/or R:G threshold or thresholds. This classification can therefore be used to generate a skin/non-skin mask of binary values.

Because the background colour of the book is designed to generate a very high green or blue pixel colour value in the captured image, the threshold level(s) as empirically determined can be made very sensitive to a wide range of skin tones from pale white to dark black, all of which comprise a higher proportion of red than the book. That is to say, the threshold level(s) can be set aggressively to encompass a large range of skin tones.

This therefore provides a robust and computationally simple method of detecting the user's skin without the need for any calibration by the user.

The above technique works well at generating a mask over the book for use with the augmentation layer, so that the user's hand appears to be above the graphics being superposed on the book.

Figure 4A:
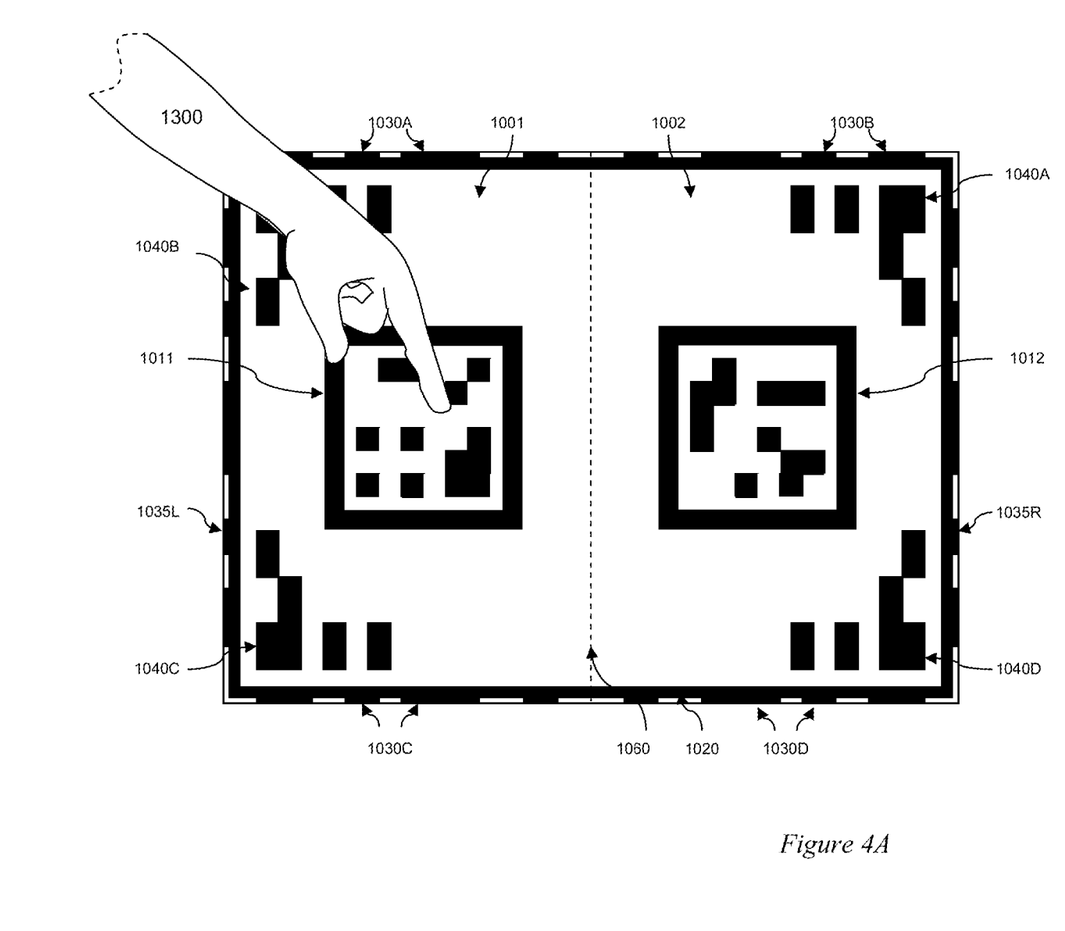
FIG. 4A is a schematic diagram of a captured video image of a book in accordance with an embodiment of the present invention.

Hence, referring to FIG. 4A, in an example of this process a user's hand (1300) is placed over the physical book. In this case, the book is shown open on pages 1 and 2 and comprising a number of optional printed elements in addition to the fiduciary markers 1011 and 1012 of pages 1 and 2 (1001, 1002), including non-alphanumeric patterns (1040A-D) located between the fiduciary marker and one or more outer edges of the book, and which can be used to identify a new page as the leaf above it is turned before the fiduciary marker on the same page comes into view, thereby enabling earlier augmentation of the revealed page. Each non-alphanumeric pattern is thus capable of indicating at least the opposing page pair comprising the respective page on which the non-alphanumeric pattern is positioned, when used in conjunction with the scale and orientation of the book as indicated by a fiduciary marker on a different page of the book. In addition, border patterns (1030A-D, 1035L,R) may be provided where the cover of the book extends beyond the dimensions of the pages. These patterns are again in the same blue or green colour scheme as the pages of the book and can be used for example to detect whether a page or pages of the book are being turned, or whether the book itself is being closed (only this second action results in a corresponding turning of the border patterns). This can be used to suppress the initial display of a generic or estimated augmented page when the book is being closed. Such an initial display may be used normally to hide the new blue or green page being revealed until it can be identified properly by the non-alphanumeric pattern or fiduciary marker printed on it.

Figure 4B:
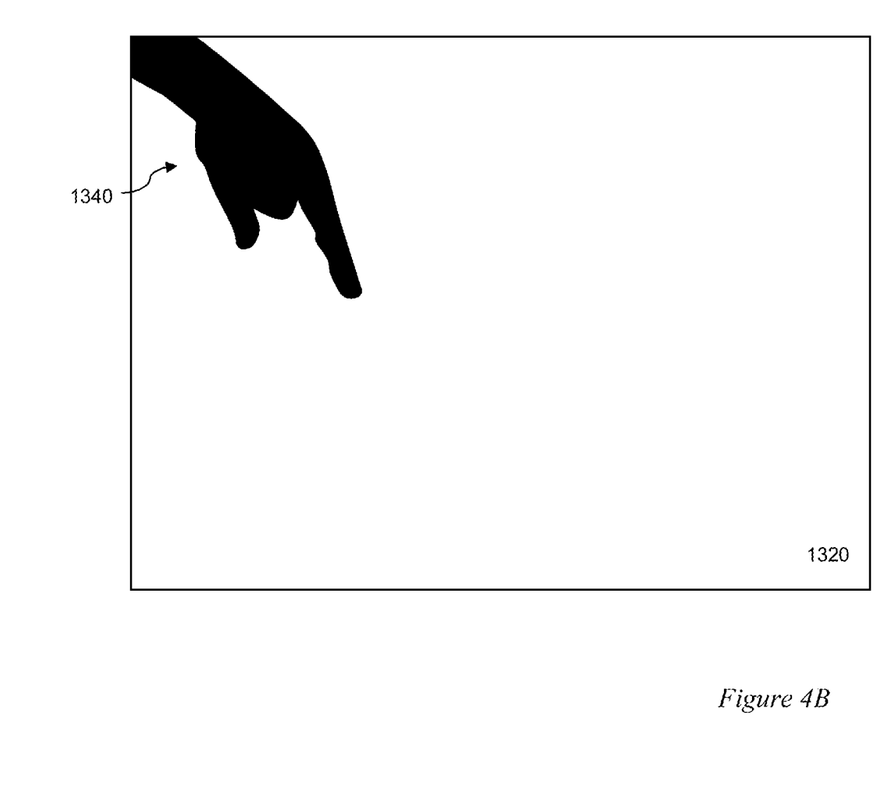
FIG. 4B is a schematic diagram of a mask in accordance with an embodiment of the present invention.

Referring now to FIG. 4B, a skin mask is initially generated based upon the estimated area of the book as described previously, based upon the above described detection of the difference between the predominantly blue or green pages of the book and the user's skin. This skin mask may be referred to as the original skin mask. FIG. 4B shows such an original skin mask 1320 corresponding to the estimated area of the book shown in FIG. 4A. In this original skin mask, the area of pixels 1340 corresponding to skin tones is shown in black. These pixels may be referred to as skin pixels within the context of the skin mask (i.e. binary values identifying where skin pixels are to be found in the video image).

Figure 4C:
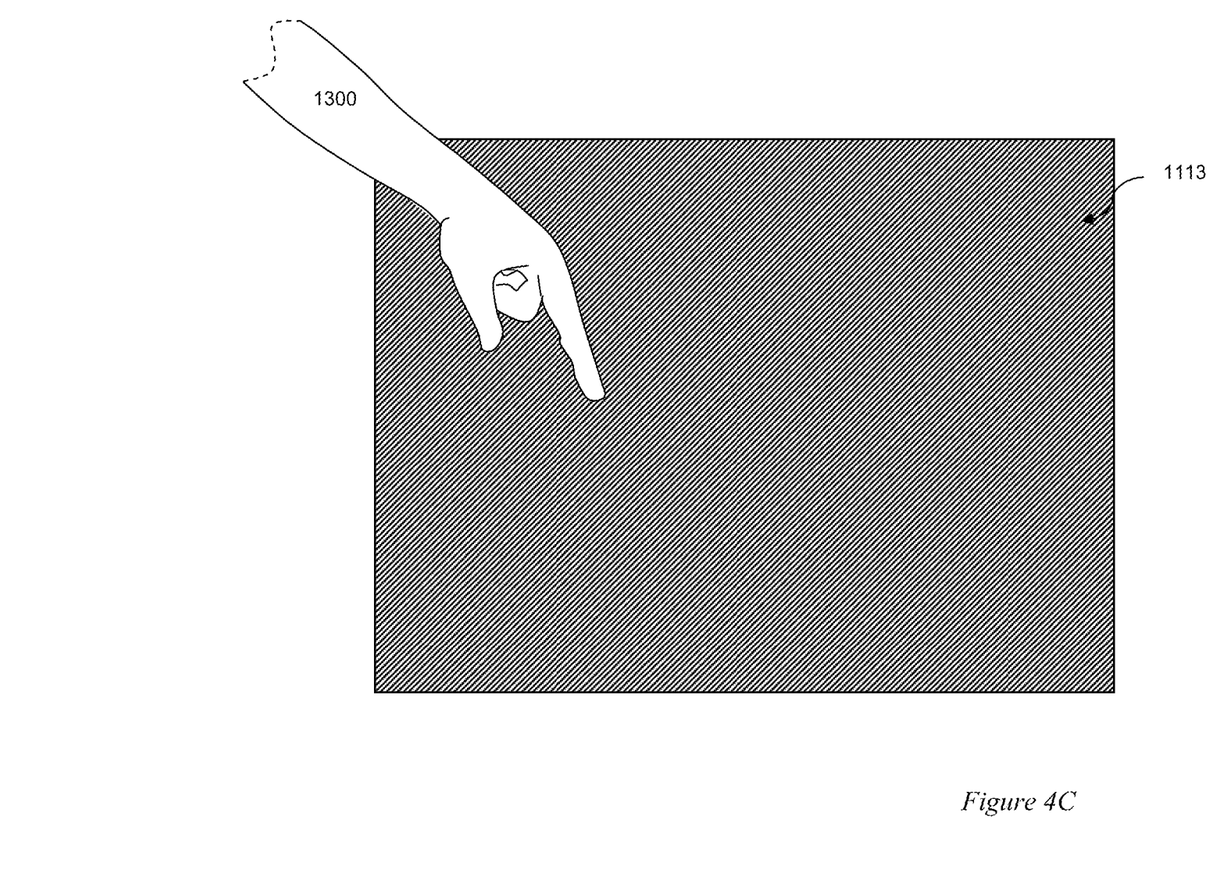
FIG. 4C is a schematic diagram of a captured video image of a book augmented in accordance with an embodiment of the present invention.

Referring now also to FIG. 4C, in the resulting augmented image, the overlaid computer graphics (1113) are superposed over the estimated area of the book (as calculated based upon the position, scale, orientation of the fiduciary markers, and the known physical relationship of these to the book, as explained previously) and in this case completely obscure it, except for those areas of the book that are masked off as skin pixels by the original skin mask. The result, as desired, is that the user's hand 1300 appears to remain above the computer graphics.

However, in practice the calculation of the area of the book described above may not be perfectly accurate. Reasons for this include the resolution of the input video image, which gives the vertical and horizontal measurements of the fiduciary markers a finite accuracy. That is to say, the book could be tilted or rotated or repositioned by a small amount and nevertheless still map the fiduciary marker onto the same pixels in the input video image. However, the book as a whole is typically 3 to 6 times the size of the fiduciary marker, and consequently that same small range of angles may result in an error in the estimation of the area of the book that is in the order of typically 1 to 5 pixels. The extent of the error may be a function of the relative angle of the fiduciary marker (e.g. shallow angles may result in greater errors in estimation) and so the magnitude of the possible error may be estimated according the apparent angle of the fiduciary marker.

In any event, because the book is mostly pale blue (or pale green), where the error results in the augmentation being misaligned and not wholly covering the book, this is very obvious in the augmented image.

This error can be mitigated in several ways.

One way is to check the video image when first estimating the area of the book in the video image; the estimated area of the book can be compared with the video image, and any pixel in the video image immediately outside the boundary of the estimated area that is (to within a tolerance) the same colour as the neighbouring pixel immediately inside the boundary can be classified as part of the book. If more than a threshold percentage of pixels outside the boundary on any side of the book area are classified in this way, then the area can be extended by one pixel on that side and the process can be repeated, to grow the estimate until it fits. There are several problems with this approach, however—the first is that if the background (for example a carpet that the book is placed upon) is also within the tolerance for the colour scheme, then the system might erroneously classify the background as part of the book. The other problem is caused by aliasing. The colour of the pixel at the edge of the book may be a mix of blue (for example) and the background colour due to aliasing, and the proportion of blue may change on a pixel-by pixel basis. Consequently the apparent extent of the book may rapidly fluctuate by ±1 pixel, which is undesirable. A third problem is that where the user's hands or arms occlude a large proportion of a boundary (which may be the case if the user is holding the book) then there may not be enough of a boundary on one side to confidently check for a threshold number of pixels outside the boundary in any case. In short, there are a large number of fluctuating variables and conditions associated with checking the edge of the book area that make consistent interpretation of the video images difficult.

Consequently, another way however is simply to assume that the book is fractionally larger than it is estimated to be, so that the augmentation extends in the order of typically 1 to 5 pixels beyond the estimated area of the book in the augmented image. As noted above, the extent of the likely error may be proportional to the current orientation of the fiduciary marker(s) and this may be used to select how far to extend the augmentation. In practice, for most cases the augmentation extends 1 or 2 pixels beyond the calculated extent of the book.

This is a relatively simple way to hide errors in estimation of the area of the book, by over-estimating by a few pixels.

Figure 5:
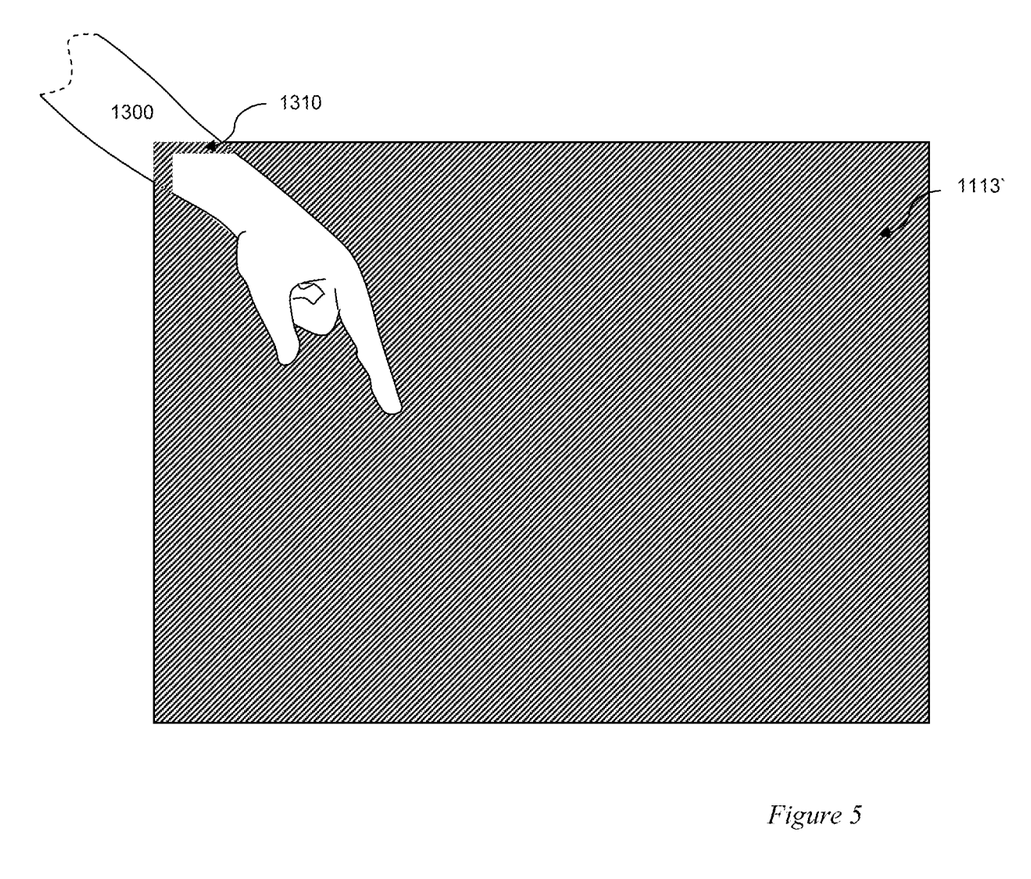
FIG. 5 is a schematic diagram of a captured video image augmented with a computer graphic.

However, referring now to FIG. 5, this introduces a new problem. In FIG. 5, expanded computer graphic 1113' is (for the purposes of example only) 5% larger than the estimated area of the book it overlays.

Meanwhile, the skin mask used to ensure that the user's skin appears on top of the superposed computer graphics is still based upon the original estimated area of the book. As a result the computer graphic will now overlay an area of the user's skin 1310 in the video that lies beyond the estimated area of the physical book and is not included in the skin mask. As illustrated in FIG. 5, the effect is that a thin border of computer graphic pixels appears on top of the user's hand/arm at the point where these cross onto the surface of the book.

An apparent solution might be simply to extend the detection of skin pixels to the expanded area of the computer graphic. However, the aggressive skin tone detection applied by the system is based upon the assumption that the background is the blue or green of the book, and this assumption cannot be guaranteed outside the estimated area of the book. As a result if the skin pixel detection process is applied to the expanded area of the computer graphic, then (depending on the colour of the background, for example a red carpet) much of the expanded area would be incorrectly masked off as skin.

In principle this could be seen to address the book size estimation error in a complementary manner to the first solution; rather than adding pixels to the book if the they are blue/green, delete them from the expanded book area if they are not blue/green. However, it will be appreciated that this approach suffers from the same problems as the first approach, namely failure when a confusing background is present (here blue or green as applicable) and fluctuations due to aliasing.

Figure 6:
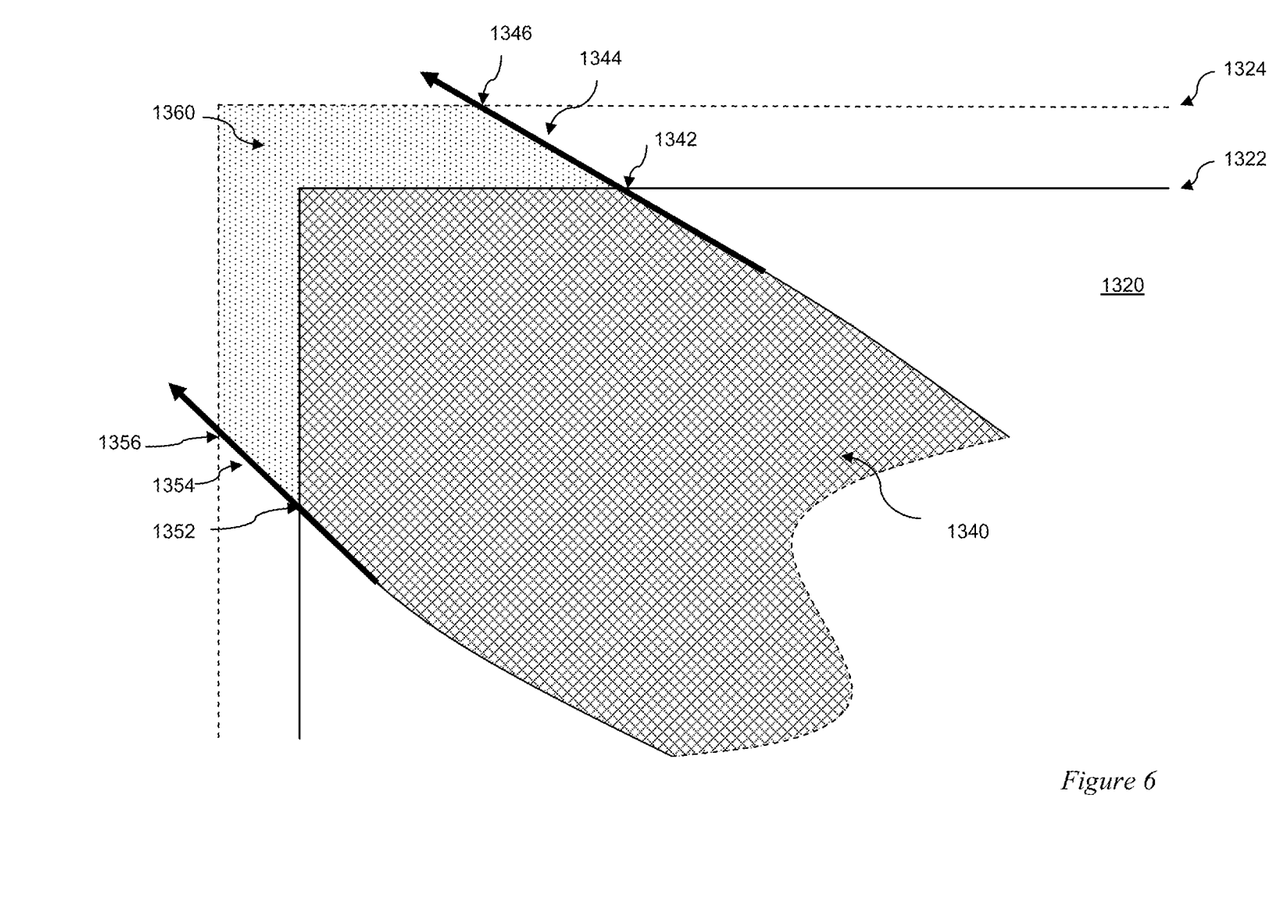
FIG. 6 is a schematic diagram of a mask in accordance with an embodiment of the present invention.

Consequently, referring now to FIG. 4B and also to FIG. 6, in an embodiment of the present invention then as noted previously the original skin mask is initially generated based upon the original estimated area of the book, as shown in FIG. 4B.

FIG. 6 shows a close-up view of the corner of the original skin mask of FIG. 4B, where the area 1340 corresponding to skin pixels in the mask reach the edge 1322 of the original skin mask, thus indicating the region where the user's hand/arm passes across the estimated edge of the book.

This region can be found automatically by analysing the boundary of the original skin mask for a contiguous set of skin pixels along the boundary (i.e. more than a predetermined threshold number of pixels). This number may be proportional to the current scale of the book in the video image, which in turn is indicative of the likely scale of the user's hand/arm in the video image when positioned over the book.

The first and last pixels in such a set (1342, 1352) can then be used as follows to predict a further area where the user's hand/arm projects beyond the extent of the original skin mask.

Hence in an embodiment of the present invention, any suitable edge-tracking technique known in the art may be used to track the respective edges of the skin pixel region progressing into the mask area, starting from each of the first and last pixels mentioned above (1342, 1352).

This tracking may proceed for a predetermined distance (again optionally proportional to the currently detected scale/size of the book in the video image) to reach points along the edge of the silhouette of the user's hand/arm defined by the mask.

Once tracked for this predetermined distance, a line (1344, 1354) between the reached points and the respective first or last pixel forming the starting point for the edge tracking may be calculated and projected out of the mask. The line may be linear or a curve based on a polynomial fit to the tracked edge of the skin pixel region of the mask. Hence the lines predict how the outer edges of the user's hand/arm are likely to continue beyond the original estimated area of the book within the video image into a neighbouring region.

Given these predictions it is then possible to calculate the intersection (1346, 1356) of these lines with the edge (1324) of the expanded estimate of the area of the book used for the expanded graphics (1113'). The area bounded by the edge of the original estimate of the area of the book (1322), the edge of the expanded estimate of the area of the book (1324), and the lines calculated from the skin mask (1344, 1354), then represents the probable skin area (1360) likely to comprise additional skin pixels that should not be covered by the expanded computer graphics. Consequently, the skin mask may be extended to match the expanded estimated area of the book. The extended areas of the mask are assumed to be non-skin pixels, except in the probable skin area (1360) derived above.

In this probable skin area, the mask may simply be filled in with skin pixel mask values. Alternatively, the probable skin area may be analysed with a skin detector as described previously, optionally with different R:B and/or R:G ratio thresholds. Because the area very closely matches the likely position of skin in the video image, the likelihood of extensive misclassification of background as skin in this area is small, making the use of a detector in this region acceptable.

Optionally, the probable skin area may be extended parallel to the respective edges of the estimated areas by a few pixels (e.g. between 1 and 5 pixels, optionally proportional to the currently detected scale/size of the book in the video image, or the size of the probable skin area itself). In other words, the new skin area may be expanded by a predetermined number of pixels in the region between the original estimated book area and the expanded estimated book area. This reduces the chance that the video image of the user's hand/arm will be clipped by the new skin mask, at the potential cost of a few pixels being misclassified as skin pixels (again, this extended area may simply be set as skin pixels in the mask, or made subject to a skin detection process).

Hence by use of the techniques in the above embodiments it is possible to alleviate the problem of the expanded computer graphic lying over a region of skin neighbouring the edge of the book, by selectively detecting (or setting) skin mask pixels neighbouring the original estimated area of the book in a region predicted based upon skin mask pixels detected within the original estimated area of the book, so that the issues of background colour and aliasing jitter become substantially moot for the area where skin is actually to be detected.

It will be appreciated that the prediction of how the outer edges of the user's hand/arm are likely to continue beyond the original estimated area of the book within the video image may be made by any suitable means, including for example estimating a mid-line within the skin pixels of the original skin mask and hence an overall direction for the skin pixels, and then propagating the skin pixels from the first and last skin pixels as defined above (1342, 1352) into the neighbouring region in the direction indicated by the midline.

In another embodiment of the present invention, the original skin mask is made fractionally smaller than the original estimate of the area of the book, for example by a few (1-5) pixels. This mitigates the effects of an error in the original estimate that strays beyond actual area of the book in the video image by a few pixels, such that some background pixels are evaluated using the aggressive skin tone detection process. Then, the skin mask can be extended either to the original estimated area of the book or the expanded estimated area of the book (as required) and the extended areas filled in within any new skin areas identified as per the process described previously.

Hence, in a summary embodiment of the present invention, an entertainment device for augmented reality applications (e.g. the PS3, 10) comprises a video input for receiving a video image (e.g. USB, WiFi or Bluetooth® inputs), an image processor operable to estimate the extent of an identified surface (1320) captured within the video image (e.g. the Cell processor 100 and/or the Reality Synthesiser graphics unit 200 operating under suitable software instruction), a skin pixel detector (e.g. again the Cell processor 100 operating under suitable software instruction) operable to identify skin pixels within a test area (1320) corresponding to the estimated extent of the identified surface within the video image, a processor (e.g. again the Cell processor 100 operating under suitable software instruction) arranged in operation to extrapolate positions for skin pixels within the video image that are outside the test area, based upon the identified skin pixels, a mask generator (e.g. the Cell processor 100 and/or the Reality Synthesiser graphics unit 200 operating under suitable software instruction) operable to generate a mask from a combination of identified skin pixels and extrapolated skin pixels, and the processor being operable to set an extent of a computer graphic to be superposed substantially on top of the identified surface within the video image, the extent being greater than the estimated extent of the identified surface, and the image processor being operable to superpose the graphical augmentation of the video image responsive to the generated mask. It will be appreciated that the generated mask will have the same extent as the computer graphic, or optionally larger.

In an instance of the summary embodiment, the test area (1320) is the same as the estimated extent of the identified surface within the video image. In an alternative instance however, the test area extends to within a predetermined number of pixels from the edge of the estimated extent of the identified surface within the video image. As described previously, the predetermined number of pixels may be responsive to the area that the book is estimated to occupy in the video image.

In either case, in an instance of the summary embodiment, as described previously the processor is arranged in operation to identify a region of skin pixels (1340) that intersects the edge (1322) of the test area, and for that identified region it is arranged in operation to identify a first peripheral skin pixel (1342, 1352) at the edge, trace the periphery of the region away from the edge for a predetermined distance and extrapolate the trace out (1344, 1354) from the edge of the test area.

Alternatively, in an instance of the summary embodiment, then as described previously the processor is arranged in operation to identify a region of skin pixels (1340) that intersects the edge (1322) of the test area, and for that identified region it is arranged in operation to calculate a centreline that intersects with the edge of the test area (e.g. using a skeletal modelling technique or other suitable technique), calculate a region width perpendicular to the centreline—for example the width at the point where a line perpendicular to the centreline intersects with one of the first peripheral skin pixels (1342, 1352)—and propagate the identified region outside the edge of the test area responsive to the direction of the centreline and the calculated region width.

In either case, in an instance of the summary embodiment, the mask generator is arranged in operation to identify the region of extrapolated skin pixels between the edge of the test area and the edge of the extent of the computer graphic, and generate a mask representative of the identified skin pixels and the identified extrapolated skin pixels. As part of the process of identifying suitable extrapolated skin pixels, the mask generator may be operable to detect whether an extrapolated skin pixel in the identified region satisfies a skin pixel colour test, and only identify the pixel as an extrapolated skin pixel if it passes the test.

In practice, the entertainment device will be used in conjunction with a video camera operably coupled to the entertainment device, and a book which as described herein comprises at least a first fiduciary marker for the purpose of identifying a surface of the book.

Figure 7:
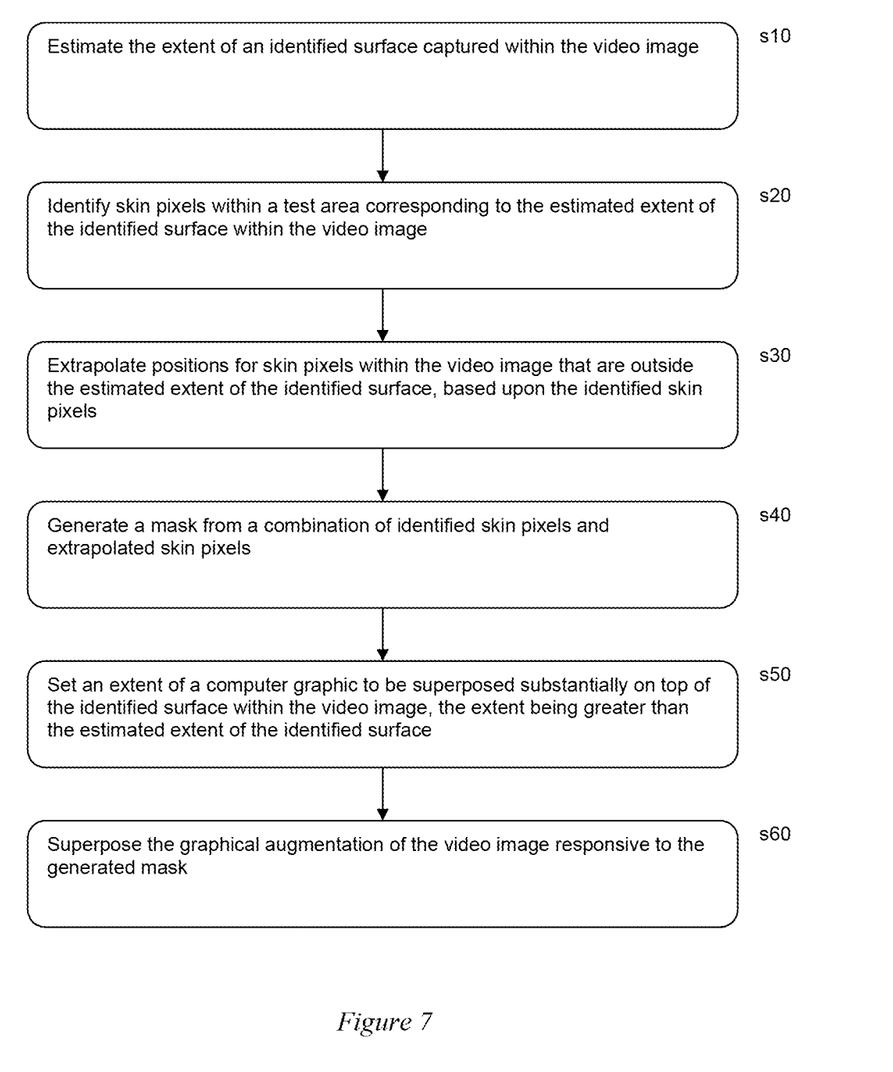
FIG. 7 is a flow diagram of a method of augmenting a video image in accordance with an embodiment of the present invention.

Turning now to FIG. 7, a method of augmenting a video image comprises:
- in a first step s10, estimating the extent of an identified surface captured within the video image;
- in a second step s20, identifying skin pixels within a test area corresponding to the estimated extent of the identified surface within the video image;
- in a third step s30, extrapolating positions for skin pixels within the video image that are outside the test area, based upon the identified skin pixels;
- in a fourth step s40, generating a mask from a combination of identified skin pixels and extrapolated skin pixels;
- in a fifth step s50, setting an extent of a computer graphic to be superposed substantially on top of the identified surface within the video image, the extent being greater than the estimated extent of the identified surface; and
- in a sixth step s60, superposing the graphical augmentation of the video image responsive to the generated mask.

It will be apparent to a person skilled in the art that variations in the above method corresponding to operation of the various embodiments of the apparatus as described and claimed herein are considered within the scope of the present invention, including but not limited to:
- either the test area being the same as the estimated extent of the identified surface within the video image, or test area extending to within a predetermined number of pixels from the edge of the estimated extent of the identified surface within the video image;
- in either case, the extrapolation step comprising identifying a region of skin pixels that intersects the edge of the test area, and for that identified region, identifying a first peripheral skin pixel at the edge, tracing the periphery of the region away from the edge for a predetermined distance, and extrapolating the trace out from the edge of the test area, or
- the extrapolation step comprising identifying a region of skin pixels that intersects the edge of the test area, and for that identified region, calculating a centreline that intersects with the edge of the test area, calculating a region width perpendicular to the centreline, and propagating the identified region outside the edge of the test area responsive to the direction of the centreline and the calculated region width;
- in any event, the step of generating a mask comprising identifying the region of extrapolated skin pixels between the edge of the test area and the edge of the extent of the computer graphic, and generating a mask representative of the identified skin pixels and the identified extrapolated skin pixels,
- and in which the step of identifying the region of extrapolated skin pixels may comprise detecting whether an extrapolated skin pixel satisfies a skin pixel colour test, and identifying the pixel as an extrapolated skin pixel if it passes the test.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, if applicable the computer program may take the form of a transmission via data signals on a network such as an Ethernet, a wireless network, the Internet, or any combination of these or other networks.

Although illustrative embodiment of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

We claim:

1. A method of augmenting a video image, comprising the steps of:
    estimating an extent of an identified surface captured within the video image, the identified surface having a non-skin tone;
    identifying skin pixels within a test area corresponding to the estimated extent of the identified surface within the video image;
    extrapolating positions for skin pixels within the video image that are outside the test area, based upon the identified skin pixels;
    setting an extent of a computer graphic to be superposed substantially on top of the identified surface within the video image, the extent being greater than the estimated extent of the identified surface;
    generating a mask from a combination of identified skin pixels and extrapolated skin pixels, the mask having at least the same extent as the computer graphic; and
    superposing a graphical augmentation of the video image responsive to the generated mask.

2. A method according to claim 1, in which the test area is the same as the estimated extent of the identified surface within the video image.

3. A method according to claim 1, in which the test area extends to within a predetermined number of pixels from the edge of the estimated extent of the identified surface within the video image.

4. A method according to claim 1, in which the extrapolating step comprises:
    identifying a region of skin pixels that intersects the edge of the test area; and
    for the identified region:
        identifying a first peripheral skin pixel at the edge;
        tracing the periphery of the region away from the edge for a predetermined distance; and
        extrapolating the trace out from the edge of the test area.

5. A method according to claim 1, in which the extrapolating step comprises:
    identifying a region of skin pixels that intersects the edge of the test area; and
    for the identified region:
        calculating a centreline that intersects with the edge of the test area;
        calculating a region width perpendicular to the centreline; and
        propagating the identified region outside the edge of the test area responsive to the direction of the centreline and the calculated region width.

6. A method according to claim 1 in which the step of generating a mask comprises:
    identifying the region of extrapolated skin pixels between the edge of the test area and the edge of the extent of the computer graphic; and
    generating the mask representative of the identified skin pixels and the identified extrapolated skin pixels.

7. A method according to claim 6, in which the step of identifying the region of extrapolated skin pixels comprises:
    detecting whether an extrapolated skin pixel satisfies a skin pixel colour test, and
    identifying the pixel as an extrapolated skin pixel if it passes the test.

8. A non-transitory computer program product comprising computer program instructions that when performed by a processor implement a method comprising the steps of:
    estimating an extent of an identified surface captured within the video image, the identified surface having a non-skin tone;
    identifying skin pixels within a test area corresponding to the estimated extent of the identified surface within the video image;
    extrapolating positions for skin pixels within the video image that are outside the test area, based upon the identified skin pixels;
    setting an extent of a computer graphic to be superposed substantially on top of the identified surface within the video image, the extent being greater than the estimated extent of the identified surface;
    generating a mask from a combination of identified skin pixels and extrapolated skin pixels, the mask having at least the same extent as the computer graphic; and
    superposing the graphical augmentation of the video image responsive to the generated mask.

9. An entertainment device for augmented reality applications, comprising:
    a video input configured to receive a video image;
    an image processor configured to estimate an extent of an identified surface captured within the video image, the identified surface having a non-skin tone;
    a skin pixel detector operable to identify skin pixels within a test area corresponding to the estimated extent of the identified surface within the video image;
    a processor arranged in operation to extrapolate positions for skin pixels within the video image that are outside the test area, based upon the identified skin pixels,
    the processor being configured to set an extent of a computer graphic to be superposed substantially on top of the identified surface within the video image, the extent being greater than the estimated extent of the identified surface;
    a mask generator configured to generate a mask from a combination of identified skin pixels and extrapolated skin pixels, the mask having at least the same extent as the computer graphic; and
    the image processor being configured to superpose the graphical augmentation of the video image responsive to the generated mask.

10. An entertainment device according to claim 9, in which the test area is the same as the estimated extent of the identified surface within the video image.

11. An entertainment device according to claim 9, in which the test area extends to within a predetermined number of pixels from the edge of the estimated extent of the identified surface within the video image.

12. An entertainment device according to claim 9, in which the processor is arranged in operation to:
- identify a region of skin pixels that intersects the edge of the test area; and
- for the identified region:
  - identify a first peripheral skin pixel at the edge;
  - trace the periphery of the region away from the edge for a predetermined distance; and
  - extrapolate the trace out from the edge of the test area.

13. An entertainment device according to claim 9, in which the processor is arranged in operation to:
- identify a region of skin pixels that intersects the edge of the test area; and
- for the identified region:
  - calculate a centreline that intersects with the edge of the test area;
  - calculate a region width perpendicular to the centreline; and
  - propagate the identified region outside the edge of the test area responsive to the direction of the centreline and the calculated region width.

14. An entertainment device according to claim 9, in which the mask generator is arranged in operation to:
- identify the region of extrapolated skin pixels between the edge of the test area and the edge of the extent of the computer graphic;
- detect whether an extrapolated skin pixel in the identified region satisfies a skin pixel colour test, and
- identify the pixel as an extrapolated skin pixel if it passes the test; and
- generate the mask representative of the identified skin pixels and the identified extrapolated skin pixels.

15. An augmented reality system, comprising:
- an entertainment device for augmented reality applications, comprising:
  - a video input configured to receive a video image;
  - an image processor configured to estimate an extent of an identified surface captured within the video image;
  - a skin pixel detector operable to identify skin pixels within a test area corresponding to the estimated extent of the identified surface within the video image;
  - a processor arranged in operation to extrapolate positions for skin pixels within the video image that are outside the test area, based upon the identified skin pixels,
  - the processor being configured to set an extent of a computer graphic to be superposed substantially on top of the identified surface within the video image, the extent being greater than the estimated extent of the identified surface;
  - a mask generator configured to generate a mask from a combination of identified skin pixels and extrapolated skin pixels, the mask having at least the same extent as the computer graphic; and
  - the image processor being configured to superpose the graphical augmentation of the video image responsive to the generated mask;
- a video camera operably coupled to the entertainment device; and
- a book comprising a fiduciary marker for the purpose of identifying a surface of the book.

* * * * *